(12) United States Patent
Wankmueller et al.

(10) Patent No.: US 9,033,246 B2
(45) Date of Patent: *May 19, 2015

(54) METHODS AND SYSTEMS TO REMOTELY ISSUE PROXIMITY PAYMENT DEVICES

(71) Applicant: MasterCard International Incorporated, Purchase, NY (US)

(72) Inventors: John R. Wankmueller, Great Neck, NY (US); David A. Roberts, Warrington (GB); Paul Michael Evans, Hampshire (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,796

(22) Filed: Jun. 16, 2014

(65) Prior Publication Data

US 2014/0291395 A1 Oct. 2, 2014

Related U.S. Application Data

(63) Continuation of application No. 12/543,849, filed on Aug. 19, 2009, now Pat. No. 8,752,770.

(60) Provisional application No. 61/090,013, filed on Aug. 19, 2008.

(51) Int. Cl.
*G06K 19/00* (2006.01)
*G06Q 20/34* (2012.01)
*G06Q 20/32* (2012.01)
*G07F 7/10* (2006.01)
*G07F 11/00* (2006.01)
*G07F 17/00* (2006.01)
*G07F 17/42* (2006.01)

(52) U.S. Cl.
CPC .......... *G06Q 20/355* (2013.01); *G06Q 20/3278* (2013.01); *G07F 7/1008* (2013.01); *G07F 11/00* (2013.01); *G07F 17/0014* (2013.01); *G07F 17/42* (2013.01)

(58) Field of Classification Search
USPC .............. 235/375, 379–381, 487, 492; 705/5, 705/35–45
See application file for complete search history.

(56) References Cited

U.S. PATENT DOCUMENTS 8,752,770 B2 * 6/2014 Wankmueller et al. ....... 235/487

* cited by examiner

*Primary Examiner* — Matthew Mikels
(74) *Attorney, Agent, or Firm* — Buckley, Maschoff & Talwalkar LLC

(57) ABSTRACT

Methods and apparatus for issuing a payment device from a remote dispensing device are provided. In an embodiment, a dispensing device receives a purchase request including a load amount, to purchase a proximity payment device. The dispensing device reads proximity payment device information from a stored pre-personalized proximity payment device, establishes a secure communications channel with a security terminal, encrypts a personalization data request, transmits it to the proximity device issuer server, and receives an encrypted personalization message. The dispensing device then decrypts the encrypted personalization message to obtain personalization data, writes the personalization data and the load amount to the pre-personalized proximity payment device, and then dispenses the personalized proximity payment device.

12 Claims, 7 Drawing Sheets

METHODS AND SYSTEMS TO REMOTELY ISSUE PROXIMITY PAYMENT DEVICES

RELATED APPLICATIONS

This application claims the benefit of U.S. patent application Ser. No. 12/543,849, which was filed on Aug. 19, 2009, which is based on, and claims benefit of and priority to, U.S. Provisional Patent Application No. 61/090,013, which was filed on Aug. 19, 2008, the contents of which applications are hereby incorporated by reference in their entirety.

FIELD

The present invention relates to payment devices. In particular, the present invention relates to systems and methods wherein a proximity payment device may be personalized, loaded, and dispensed at a remote location.

BACKGROUND

Embodiments disclosed herein relate to payment systems. In particular, some embodiments relate to methods, apparatus, systems, means and computer program products for remotely issuing proximity payment devices. More particularly, some embodiments relate to remotely issuing and loading proximity payment devices from unattended devices, such as kiosks.

Proximity payment devices (otherwise referred to herein as contactless payment cards or devices), such as the PayPass® payment device issued pursuant to standards developed by MasterCard International Incorporated, are becoming more widely used. PayPass® proximity payment devices (as well as a number of other proximity payment device schemes) follow standards, such as ISO standards and the EMV standards (available at www.emvco.com). The EMV standards set forth a security infrastructure in which payment device issuers create secure keys that are used to uniquely identify payment devices issued by them.

Proximity payment devices are well-suited for a number of different payment applications. One such application is in the area of prepaid devices which may be used for transit or other low-dollar transactions. Many such prepaid applications and environments require that consumers be able to purchase (or fund) prepaid devices at unattended locations. For example, in the transit environment, it would be desirable to allow customers to purchase prepaid proximity transit cards at transit stations (e.g., such as in a subway or train station). It would further be desirable to allow customers to purchase prepaid proximity payment devices at unattended (yet secure) kiosks or terminals.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DESCRIPTION

Pursuant to some embodiments, a remote instant issuance system is provided for remotely and instantly issuing and personalizing proximity payment devices, such as pre-paid cards.

Figure 5:
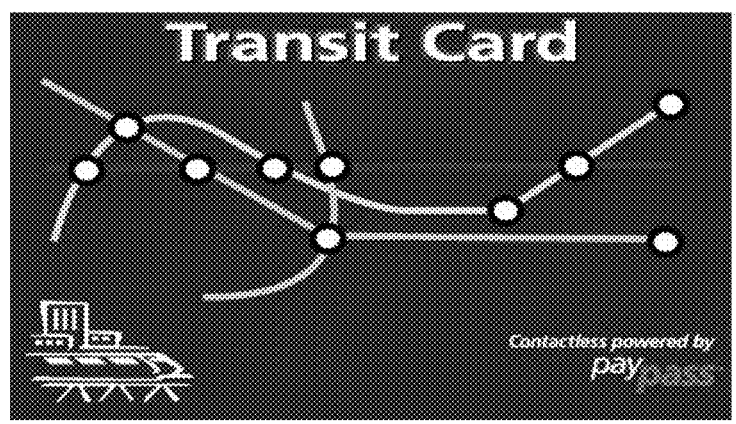
FIG. 5 is an illustration of a device that may be issued pursuant to some embodiments.
Figure 6:
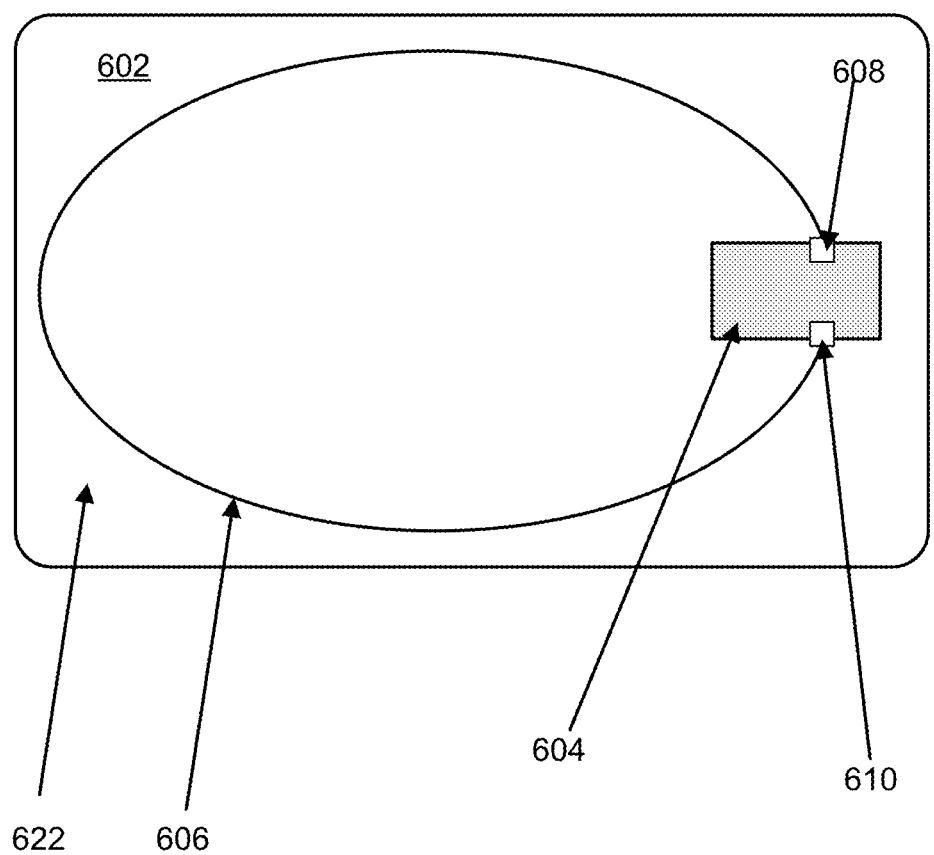
FIG. 6 is an illustration of a payment device in accordance with some embodiments.

For simplicity and ease of exposition, a number of terms are used herein. For example, the terms "proximity payment device", "payment device", "payment card" or "contactless payment card" are used to refer to payment devices that use either radio frequency or infrared technology to allow a device to communicate with a terminal to conduct a payment transaction. For example, the terms may be used to refer to devices that are compliant with ISO/IEC 14443 Standard, ISO/IEC 18000 standard, or the NFC standards including ISO/IEC 18092 / ECMA 340 and ISO/IEC 21481 / ECMA 352. As a particular example, a "proximity payment device" may be further compliant with both the ISO/IEC 14443 Standard and the "PayPass" standards promulgated by MasterCard International Incorporated. A proximity payment device may have any of number of form factors. For example, a device may be formed in the shape of a traditional credit card (with an antenna and one or more chips embedded in a substrate). Pursuant to some embodiments, a "proximity payment device" may be formed from thin paper or plastic stock in which an antenna and a microchip are embedded. Illustrative payment devices are shown in FIGS. 5 and 6 and are discussed further below.

As used herein, the term "reader" or "terminal" is used to refer to a proximity coupling device that is capable of interrogating and reading data from a proximity payment device. In some embodiments, the reader may be incorporated into, or part of, the terminal In some embodiments, the reader may be separate from (but in communication with) the terminal. A number of different types of terminals may be used, including, for example, traditional point of sale ("POS") terminals having contactless readers, computing devices (such as personal computers, handheld computers, or the like), etc.

As used herein, the term "kiosk", "dispensing device" or "remote dispensing device" is used to refer to a terminal, station, or other components configured to dispense payment devices pursuant to embodiments of the present invention. A kiosk may be an attended or unattended device such as a payment device vending machine or other system. Further details of kiosks according to some embodiments will be provided further below in conjunction with FIG. 1.

As used herein, the term "blank card stock" or "blank payment device" is used to refer to a payment device (such as a proximity payment device made of paper or plastic), which has not yet been personalized and which has not yet been configured with a payment application. A process for "pre-personalizing" such blank card stock will be described further below in conjunction with FIG. 4. "Blank card stock" cannot be used in a payment transaction until it has been both pre-personalized (as discussed in FIGS. 2A and 3) and personalized (as discussed in FIGS. 2B and 4).

Figure 2A:
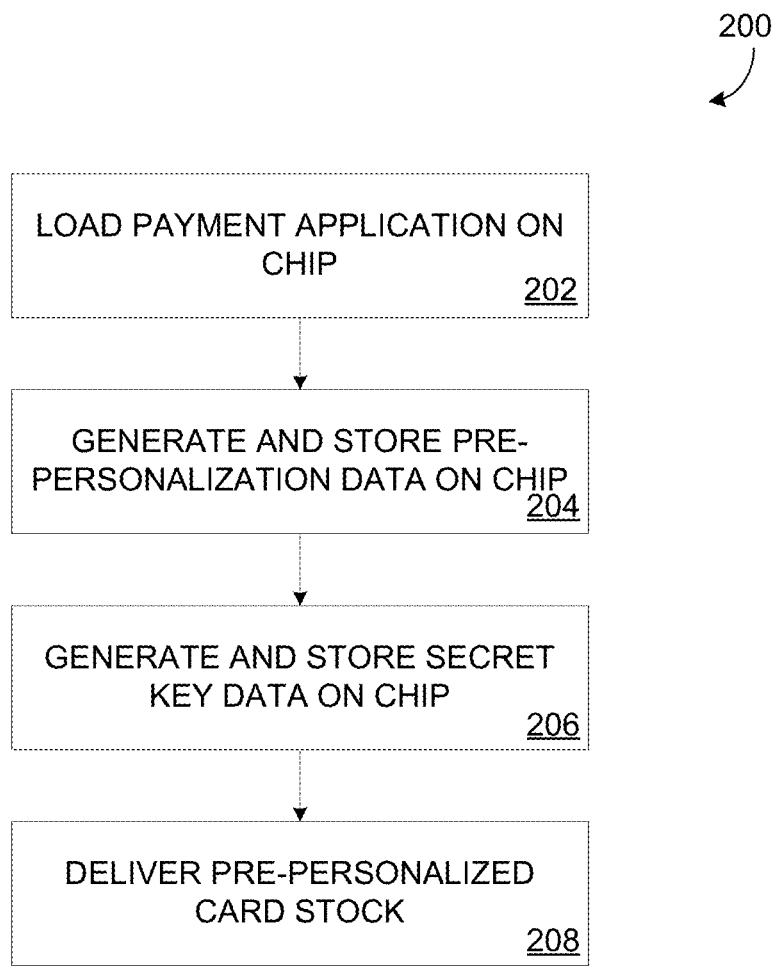
FIG. 2A is a flow chart that illustrates a process for creating pre-personalized devices in accordance with some embodiments of the present invention.
Figure 3:
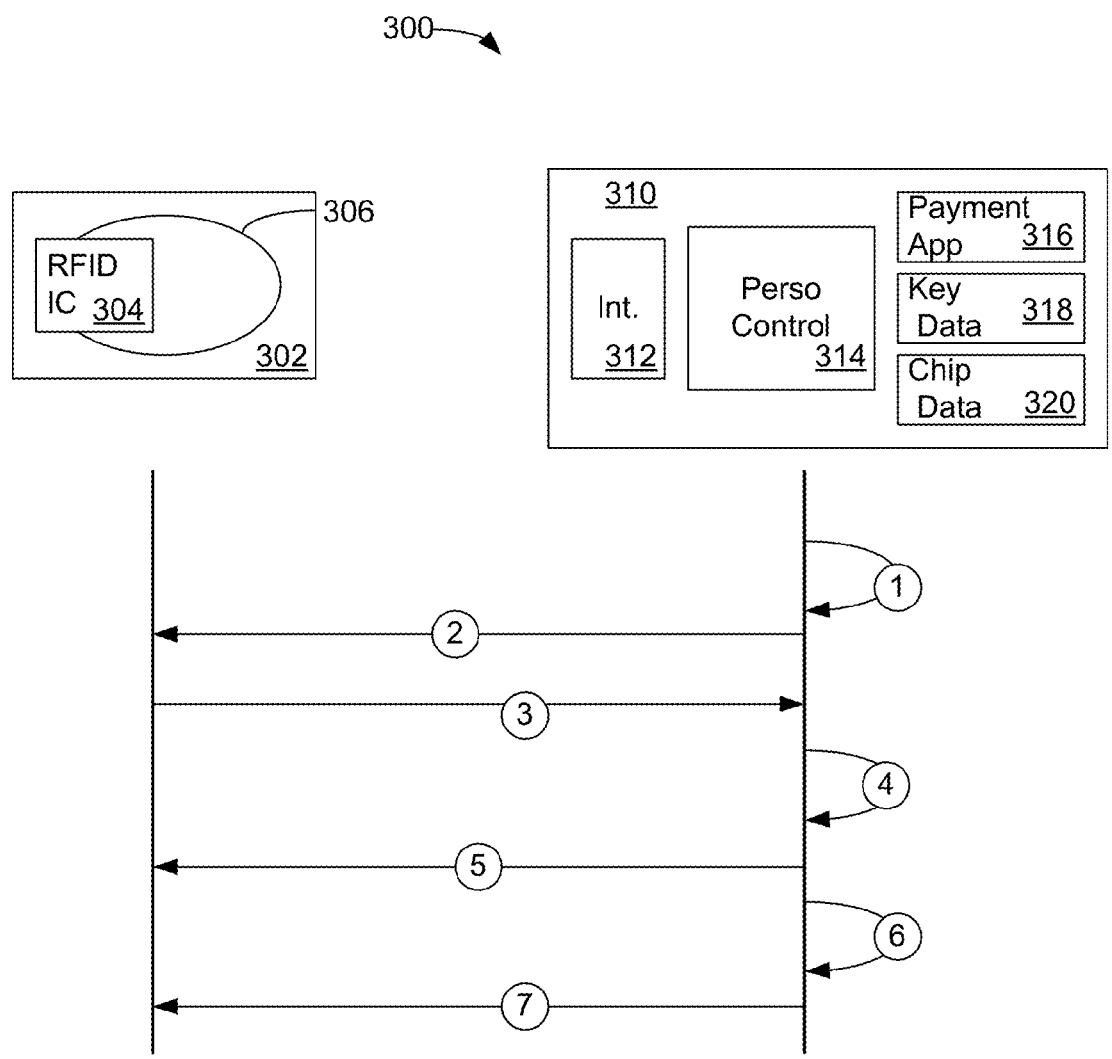
FIG. 3 is a transaction diagram that illustrates transactions to create pre-personalized devices in accordance with some embodiments of the present invention.

As used herein, the term "pre-personalizing" or "pre-personalized device" is used to refer to a device which results from a pre-personalization process such as the one described in FIGS. 2A and 3. A "pre-personalized device" may have data (including, e.g., key data and a chip serial number) and a payment application stored therein, but it may not yet be used to conduct payment transactions until it has been "personalized". As discussed below, "pre-personalized devices" may be distributed to a number of kiosks or other unattended personalization devices. As used herein, the term "personalized device" refers to a payment device which has been "pre-personalized" and "personalized" so that it has been configured for use pursuant to embodiments of the present invention. Pursuant to some embodiments, personalized devices may be created and dispensed from kiosks or other unattended terminal devices. Further details regarding each of these terms will be provided below.

Figure 1:
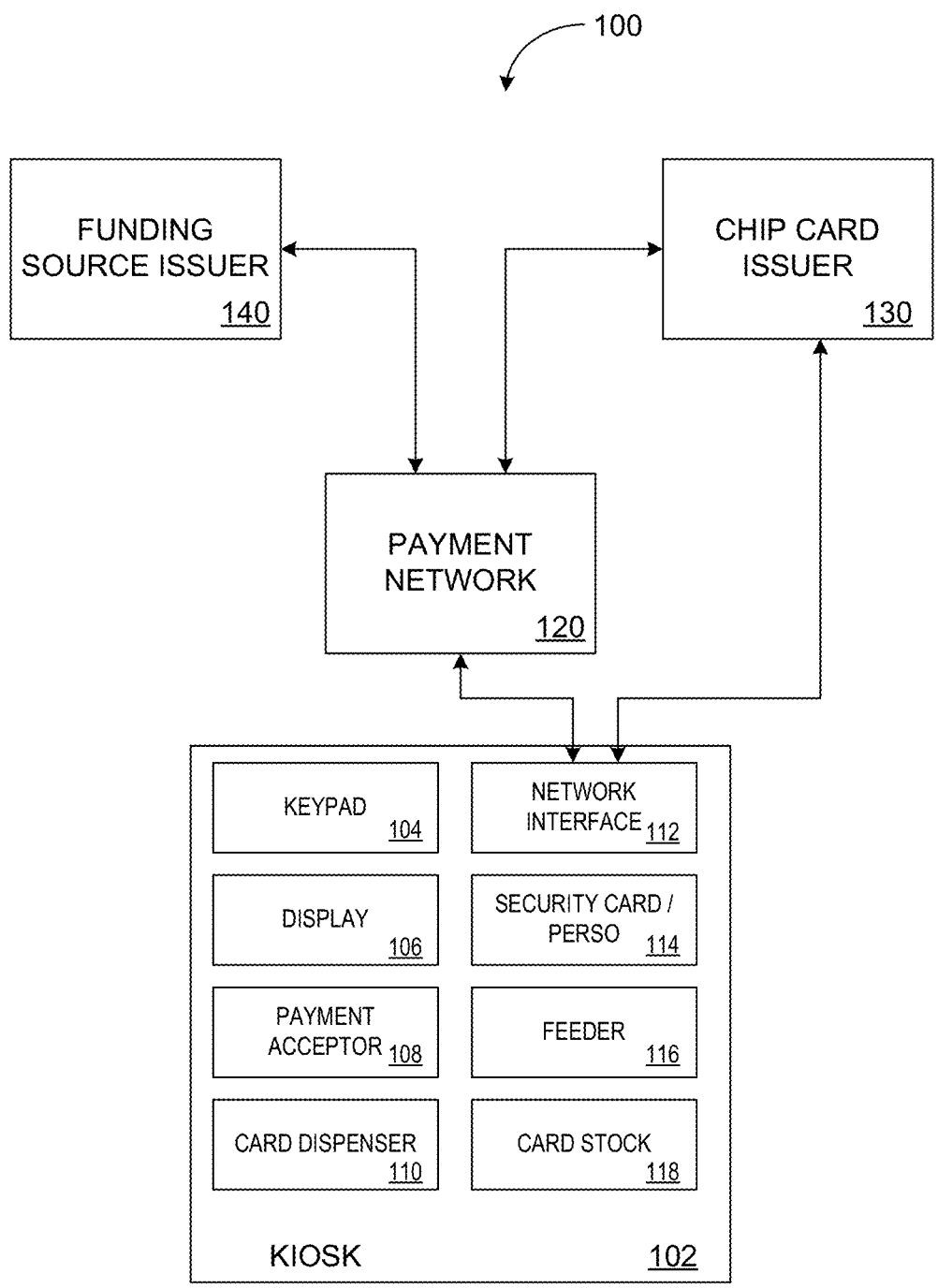
FIG. 1 is a block diagram that illustrates a system in which the present invention may be applied.

Features of some embodiments will now be described by reference to FIG. 1, where a payment system 100 for remotely issuing a proximity payment device is shown. As depicted, system 100 includes a number of systems or elements operating in cooperation to remotely issue a proximity payment device. In general, using the terms introduced above, the kiosk 102 stores a number of pre-personalized devices, and then dispenses (based on user input) one or more personalized devices which may then be used in payment transactions.

As depicted, system 100 includes a kiosk 102 in communication with a payment network 120, a chip card issuer 130 and a funding source issuer 140. For convenience, only a single kiosk 102, network 120, chip card issuer 130 and funding source issuer 140 are shown—those skilled in the art will appreciate that a number of each of the devices and systems may be provided in system 100. For example, a plurality of kiosks 102 may be in communication with a plurality of chip card issuers 130 and funding source issuers 140. Further, in some embodiments, some or all of the kiosks 102 may be in communication with issuers 130, 140 via networks including one or more payment networks 120.

For example, in some embodiments, where the payment devices dispensed from kiosk 102 are MasterCard® branded payment devices, the payment network 120 may be the BankNet® payment network operated by MasterCard International Incorporated. Those skilled in the art will appreciate that other payment networks may also be used to facilitate communication between kiosk 102 and issuers 130, 140. Further, in some embodiments, some messages may be transmitted using other networks such as, for example, the Internet or the like.

Kiosk 102 may be configured in a number of different ways, such as, for example, as a stand-alone vending machine or dispenser. Kiosk 102, pursuant to some embodiments, includes a number of components, including a keypad 104 (or other data entry device) allowing a consumer to interact with the kiosk 102 to select, fund, and purchase a proximity payment device pursuant to the present invention. Kiosk 102 may also include a display device 106 which may be used to provide instructions and options to the consumer. A payment acceptor 108 is also provided. In some embodiments, payment acceptor 108 may include a payment device reader, allowing the consumer to purchase (or fund) a proximity payment device using a valid payment device (e.g., such as a debit card or a credit card). For example, payment acceptor 108 may include a magnetic stripe card reader and/or a proximity payment device reader. In some embodiments, payment acceptor 108 may also include a bill and/or coin acceptor, allowing the consumer to purchase or fund a proximity payment device using cash or change. Those skilled in the art will appreciate that other funding sources may also be provided.

Kiosk 102 also includes a card dispenser 110 for dispensing personalized proximity payment devices. In some embodiments, as will be described further below, the proximity payment devices dispensed from kiosk 102 are formed from thin sheets of material, such as paper or plastic. An example of a proximity payment device that may be dispensed using features of the present invention is shown in FIG. 5, where a proximity payment device formed of a sheet of paper (with an embedded chip and antenna, not shown) is depicted. A further example of a proximity payment device is shown in FIG. 6, discussed below.

Dispenser 110 may include a hopper or feeder for storing a number of pre-personalized payment devices. The pre-personalized payment devices are pre-personalized prior to being loaded into the kiosk 102 (e.g., using the pre-personalization process described below in conjunction with FIGS. 2A and 3). The pre-personalized payment devices sit in the hopper or feeder until a load and personalization process occurs, after which the dispenser 110 may operate to dispense individual ones of the proximity payment devices. In some embodiments, dispenser 110 may also include a printer mechanism for printing a payment device number, funding amount and/or other transaction details on a ticket or receipt. In some embodiments, dispenser 110 may include a card embossing device for imprinting information on the face of payment devices prior to dispensing them (e.g., where the payment devices are formed from plastic or other material which may be embossed or imprinted).

Kiosk 102 also includes one or more network interface devices 112 for allowing communication between the kiosk 102 and payment network 120 and issuer 130. In some embodiments, the network interface device 112 may include a modem for connecting to network 120 and/or issuer 130 as needed. Kiosk 102 also includes one or more security card/perso modules 114 for securing communications between kiosk 102 and payment network 120 and/or card issuer 130. In some embodiments, each kiosk 102 includes a security card/perso module 114 in which the security card is a chip card issued and personalized by an individual chip card issuer 130 so that secure communications can be conducted between kiosk 102 and a specific issuer. The security card/perso module 114 operates to provide One Time Passwords (OTPs) which are used by some embodiments to create secure cryptographic session key(s) with the kiosk and remote card issuer so that payment data can be securely received by the kiosk so that the kiosk 102 can read and write payment data to a proximity payment device that is being issued from the kiosk 102.

The interaction between kiosk 102 and card issuer 130 (using security card/perso module 114) will be described in further detail below. Further details of one process for securing communications between the kiosk 102 and card issuer 130 for the transmission of personalization data is described in our co-pending, commonly-assigned U.S. patent application Ser. No. 12/018,293, the contents of which are hereby incorporated by reference in their entirety for all purposes.

Kiosk 102 also includes a feeder 116 which, in some embodiments, serves to feed or pull a proximity payment device from a stack or sheet of pre-personalized card stock 118 (comprising a plurality of pre-personalized proximity payment devices). In some embodiments, the pre-personalized proximity payment devices are formed in a sheet or roll of devices, and the feeder 116 operates to advance the roll or sheet and detach the next available payment device from the roll or sheet when a consumer requests (e.g., via keypad 104) to purchase a payment device from the kiosk 102. In some embodiments, the feeder 116 operates to feed the next available payment device to security card/perso module 114 so that the pre-personalized payment device can be personalized and issued to the consumer.

In one currently preferred embodiment, the pre-personalized card stock 118 is fan-folded pre-personalized proximity payment device (e.g., pre-personalized pursuant to PayPass or other standards as will be described further below in conjunction with FIGS. 2A and 3) paper card stock, such as that provided by ASK Contactless Inc. Pursuant to some embodiments, the pre-personalized card stock 118 is loaded in kiosk 102 without full personalization details (e.g., there is no payment account data stored in the memory of any of the devices in the card stock 118). Pursuant to some embodiments, the card stock 118 that is loaded into each kiosk 102 is issuer specific (that is, the card stock is pre-personalized with issuer data thereon). In some embodiments, a single kiosk 102 may store card stock from several different issuers. In some embodiments, each kiosk 102 has card stock from only a single issuer.

Features of some embodiments will now be described by reference to FIG. 2A, where a process 200 for pre-personalizing payment devices is shown. The process 200 may be performed at (or on behalf of) a chip card issuer (such as the issuer 130 of FIG. 1). Process 200 is performed on blank card stock (e.g., such as sheets of paper payment devices, or on individual plastic payment devices, each having RFID chips and antennas mounted therein, such as shown in FIG. 6).

Process 200 starts at 202 where a payment application is stored on each of the chip card devices (e.g., such as each individual RFID chip in each payment device of a sheet of paper payment devices, or each individual RFID chip in each payment device of a batch of plastic payment devices, etc.). In some embodiments, processing at 202 may be performed using a personalization machine operated by (or on behalf of) a chip card issuer. Any of a number of personalization machines may be used to load the application. For example, a personalization server such as the server described in our copending, commonly-assigned U.S. patent application Ser. No. 12/018,293 may be used. In general, any device or system which allows a payment application to be loaded onto a payment device may be used. The payment application may be a software application which allows a payment device (once issued) to operate as a payment device. In some embodiments, the payment applications which are loaded onto payment devices of the present invention are applications which allow the payment devices to function as pre-paid or stored value cards. As a specific illustrative example, the payment application loaded at 202 is a PayPass® payment application.

Processing continues at 204 where the issuer causes pre-personalization data to be generated and stored in the RFID chip in the payment device. The nature of the pre-personalization data to be generated and stored will depend, for example, on the issuer and the payment application which is stored on the device. However, as an illustrative example in which the payment device is configured to operate as a Pay-Pass® payment device, the pre-personalization data includes data read from the RFID chip (including a chip serial number) and uses that data to load pre-personalization data into the software application on the payment device. The pre-personalization data, in one illustrative embodiment, includes a key identifier, the version number of the key, and the chip serial number.

Processing continues at 206 where the issuer causes the generation of secret key data for the payment device and stores the data in the payment application of the payment device. For example, in an illustrative example in which the payment device is configured to operate as a PayPass® payment device, the secret key data stored in the payment application includes a unique personalization key for the PayPass® payment device. The unique personalization key is generated based on an issuer master key ("KMC") and the key data generated at 204 (e.g., including the chip serial number, the key identifier, and the key version number). In some embodiments, the secret key data is generated using an encryption scheme such as DES or the like.

Once the card stock has been pre-personalized (e.g., the payment devices now have been loaded with the payment application, the key data, and the unique personalization key), the pre-personalized card stock is delivered to kiosks for dispensing and issuance (step 208).

Figure 2B:
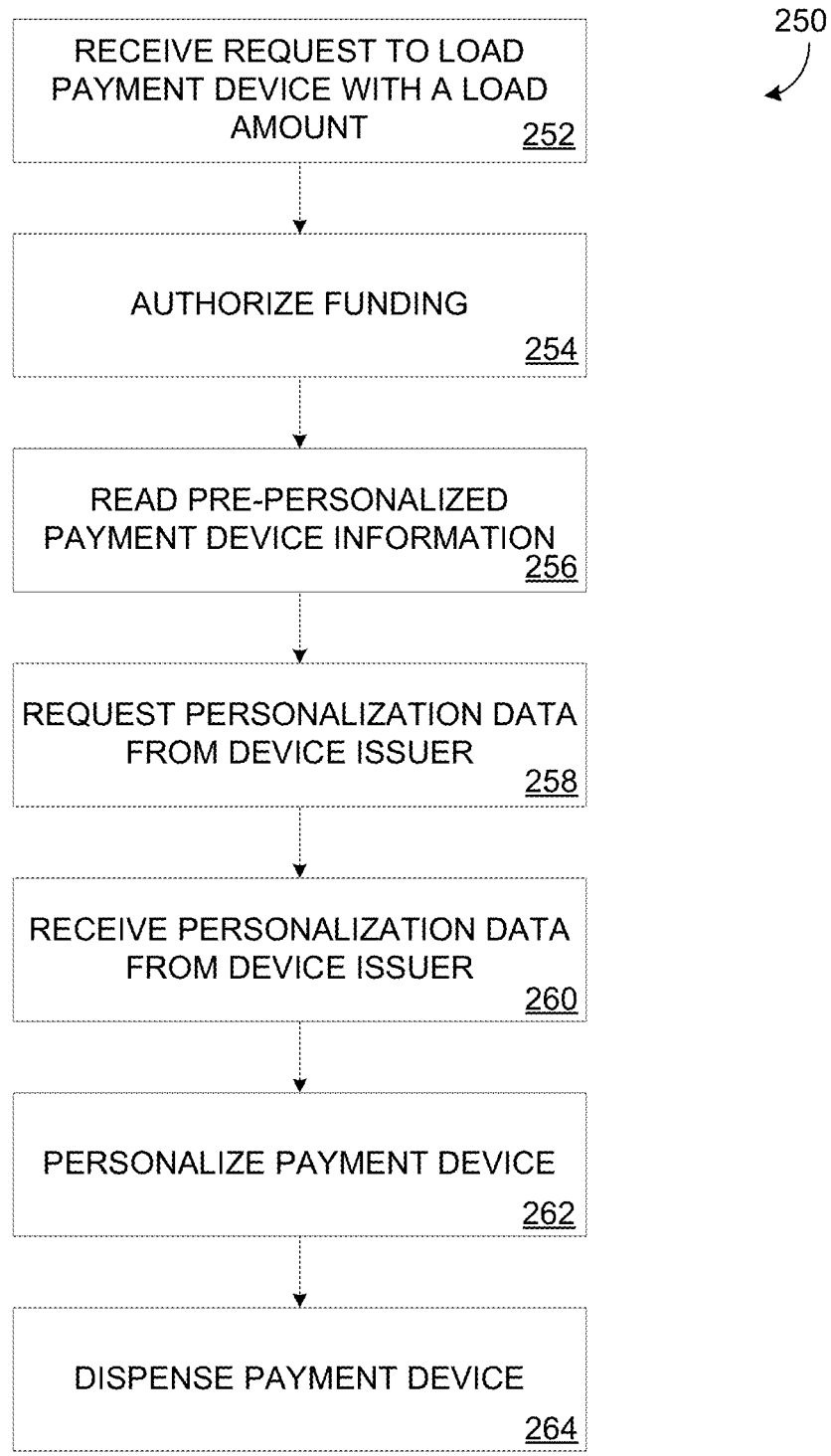
FIG. 2B is a flow chart that illustrates a process for vending and issuing personalized devices in accordance with some embodiments of the present invention.

Reference is now made to FIG. 2B, where a proximity payment device purchase transaction flow 250 is shown. The flow 250 occurs after pre-personalized card stock has been delivered to a kiosk (e.g., as a result of the completion of process 200 of FIG. 2A). In the transaction flow diagram 250, three primary entities or devices are involved in each a purchase transaction: a consumer (not shown), a kiosk 102, and a chip card issuer 130. In some embodiments, e.g., such as where the consumer pays for a card using a bank card (e.g., such as a debit or credit card), the issuer of the payment device may also be involved (e.g., such as issuer 140 of FIG. 1). In some embodiments, some of the communication between kiosk 102 and chip card issuer 130 and/or funding source issuer 140 may occur over a payment network 120 (which may be, for example, the payment network operated by MasterCard International Incorporated or other payment networks).

Process 250 begins at 252 where the kiosk (e.g., such as the kiosk 102 of FIG. 1) receives a request (from a consumer or other would-be purchaser of a payment device) to purchase a proximity payment device from the kiosk. For example, the request may be received from a consumer who interacts with the kiosk via a keypad 104 or other data entry device to request a prepaid card. The request at 204 may include a request for a payment device having a specified amount loaded on it (e.g., the consumer may request to purchase a $50 card). Processing at 252 may also include the consumer identifying how the card will be funded. For example, in some embodiments, the consumer may select from a number of different funding options, including cash, debit card, or credit card.

Processing continues at 254 where the kiosk operates to authorize funding. If the consumer selected to fund or purchase the proximity payment device using cash, processing at 254 may include verifying that sufficient cash has been inserted into the kiosk (e.g., via a payment acceptor module 108). If the consumer selected to fund or purchase the proximity payment device using a debit card or credit card, processing at 254 may include the kiosk creating a payment authorization request and transmitting the authorization request to a payment network 120 for authorization by funding source issuer 140. Pursuant to some embodiments, the authorization request processing is performed using standard payment processing techniques (e.g., the authorization request and the authorization response are formatted, transmitted and processed using existing payment network messaging techniques). If the requested funding amount is authorized at 254, processing continues at 256 where the payment device to be loaded with the funding amount is processed. If the requested funding amount is not authorized at 254, the consumer may be prompted to provide other payment means to purchase the card (and the authorization funding step 254 will be repeated until a funding source is authorized or the consumer cancels the transaction).

Processing at 256 includes the kiosk operating to physically load a pre-personalized proximity payment device (e.g., such as a PayPass® compliant paper card) from its internal tray of card stock 118. The kiosk loads the pre-personalized proximity payment device into a personalization area in the kiosk. The kiosk reads data from the pre-personalized proximity payment device, including the "key data" from the device such as the chip serial number. At this point in the process, the kiosk does not yet read the proximity payment device key.

Processing continues at 258 where the kiosk generates a personalization data request message and transmits the message to the proximity payment device issuer (or an agent of the issuer). For example, the personalization data request message may include data read at step 256 as well as the funding amount (specified by the consumer at 252, and authorized at 254). The personalization data request message may also include information identifying the kiosk. The personalization data request message is transmitted over a network to the payment device issuer for further processing. In some embodiments, the communications channel used for this communication is different than the communications channel used for the authorization request/response message previously sent to the funding source issuer 140 (at step 254).

Pursuant to some embodiments, the kiosk 102 and chip card issuer 130 interact using a secure channel established between a security device at the chip card issuer 130 and the security card 114 at the kiosk 102. For example, in some embodiments, the secure channel is established by generating and using one-time codes to (i) mutually authenticate the kiosk and the remote issuer server to each other and (ii) to create a secret session key to protect the communication link. This prevents man-in-the-middle attacks and provides protection of account data (Track1, Track2) through triple DES encryption. Further details of one approach for securing and conducting such a transaction will be provided below in conjunction with FIG. 4. In general, however, processing at 258 and 260 involve a mutually-authenticated secure channel so that the payment device issuer can safely generate and transmit personalization data to the kiosk for loading onto the payment device.

Processing at 260 includes receiving personalization data from the payment device issuer. For example, the personalization data may include payment device "track" data including, for example, a primary account number (or "PAN") and other account information needed to allow the payment device to be used in payment transactions. In one illustrative embodiment, where the payment application is a PayPass® application, the personalization data includes a PAN and other account information.

Processing continues at 262 where the kiosk (under control of the security card 114) operates to personalize the payment device. Processing at 262 includes any decryption required to decrypt the personalization data received from the payment device issuer and then transmitting the decrypted personalization data to a writer or other module for writing to an RFID IC of the payment device. In some embodiments, the writer is a contactless device which communicates with the RFID IC in a contactless communications session. In some embodiments, the writer is installed inside a Faraday cage to prevent radio wave information from leaking outside the kiosk.

Once the personalization data has been written to the payment device, processing continues at 264 where the personalized payment device is dispensed from the kiosk for use by the customer. In some embodiments, dispensing may include printing or embossing information on the payment device or on a receipt to be printed in conjunction with the dispensing of the payment device. The consumer may then use the issued and personalized payment device to conduct payment transactions.

Reference is now made to FIG. 3 which is a block diagram depicting a system 300 which may be used for pre-personalizing a proximity payment device 302. The block diagram illustrates one embodiment of a message flow (including messages 1-7) which may be generated to pre-personalize a blank card prior to delivery to a kiosk for loading and dispensing. System 400 includes a proximity payment device 402 in communication with a personalization server 410. the personalization server 410 may be operated by or on behalf of a chip card issuer 104. As shown, the proximity payment device 302 has an RFID IC 304 and one or more antennas 306 allowing the proximity payment device 302 to communicate with a contactless reader (e.g., such as through an interface 312 of personalization server 310). Personalization server 410 includes a contactless interface 412, a personalization controller 414 and a number of data sources or data stores, including a payment application data store 316, a key data datastore 318 and a chip data data store 320. Personalization server 310 may be one or more computing platforms known to those skilled in the art. The designation of personalization server 310 as a "server" is for illustration only, and those skilled in the art will appreciate that the device may be any appropriate computing system. The interface 312 may include any interface capable of communicating with the proximity payment device 302, and may include a contactless interface allowing communication in accordance with ISO Standard 14443 or the like.

Referring now to the bottom portion of FIG. 3, a number of messages are created and transmitted during a pre-personalization process according to some embodiments. Those skilled in the art will appreciate that variations of these messages which allow the personalization server to load a payment application and key data on the payment device (and maintain a record of same) may be used. In the embodiment illustrated, the process begins with a first process (labeled "1") in which the personalization server 310 operates to create a master personalization key (or "KMC"). The generation of the master personalization key may depend on the nature of the payment application or payment network being operated, and any suitable encryption scheme may be used.

A second process (labeled "2") follows, in which a payment application (e.g,. retrieved from datastore 316) is communicated to the RFID IC 304 and caused to be stored in an application memory therein. A number of different types of payment applications may be stored in the RFID IC. In some embodiments, a PayPass® payment application is stored in the RFID IC, allowing the payment device to function pursuant to the PayPass® standards. A third process ("3") involves transmitting, from the RFID IC 304 to the personalization server 310, data from the RFID IC 304. For example, a chip serial number may be transmitted in process "3".

A fourth process ("4") then occurs at the personalization server 310 in which key data for the RFID IC 304 is generated. The key data may include, for example, a key identifier and a key version number (e.g., retrieved from key data store 318). The data is then used in a message transmitted at "5" to cause the key data to be loaded into the RFID IC 304. A further process ("6") occurs at the personalization server 310 in which a unique personalization key for this specific payment device is created. In some embodiments, the unique personalization key may be generated using DES or other encryption techniques and may be based on the master personalization key ("KMC") and the key data associated with this particular payment device. The data is transmitted to the RFID IC 304 and stored therein, and a record of the data is stored in a chip data store 320 for further use.

Upon the completion of the process shown in FIG. 3, the proximity payment device 302 is ready for delivery to a kiosk for vending and issuance. At the end of the process of FIG. 3, the payment device 302 may not yet be used for payment transactions, as the card is only pre-personalized (and not fully personalized with a payment account number).

Figure 4:
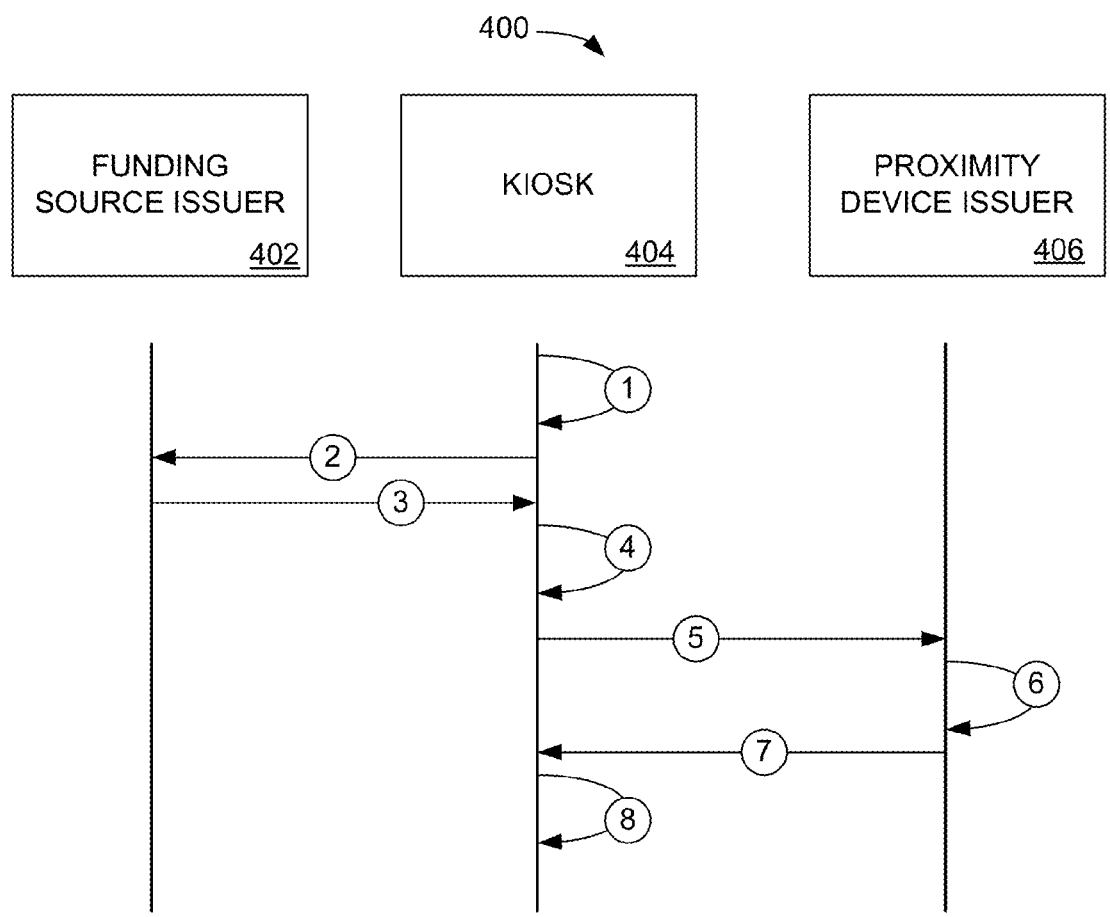
FIG. 4 is a transaction diagram that illustrates transactions to vend and issue personalized devices in accordance with some embodiments of the present invention.

Reference is now made to FIG. 4, where a block diagram of a system 400 for remotely personalizing a proximity payment device is shown (with related messages and processes). As shown, the system 400 includes a funding source issuer 402, a kiosk 404 and a proximity payment device issuer 404. The kiosk 404 may be configured as discussed above (e.g., in conjunction with FIG. 1), and the proximity payment device issuer 404 may operate a personalization server (such as device 310 discussed in conjunction with FIG. 3). The funding source issuer 402 may be an issuer of a payment card (such as a credit or debit card) which is used by a consumer to purchase (or "load") funds onto a proximity payment card to be dispensed from kiosk 404.

The bottom portion of FIG. 4 illustrates a series of processes or messages that may be generated to personalize a pre-personalized proximity payment device held within kiosk 404 so that the personalized proximity payment device may be dispensed to a consumer for use in payment transactions. The process begins at step "1" where the kiosk receives a request from a consumer to load or purchase a proximity payment device (e.g., the request may be received via keypad or other data entry device of the kiosk). In the illustrative flow shown in FIG. 4, the consumer has requested to purchase or load funds onto the device using an existing payment card (such as a credit card). A message "2" is generated by the kiosk requesting authorization of the purchase (or load) transaction. The authorization request message may be sent to the funding source issuer 402 associated with the payment card used to fund the transaction. Using standard authorization techniques, the issuer 402 either authorizes or declines the transaction. Assuming the transaction was authorized, an authorization response message "3" is transmitted to the kiosk 404.

The kiosk 404 then operates (e.g., using stored code) to read data ("4") from a next available pre-personalized proximity payment device (e.g., such as one stored in feeder or hopper of the kiosk). In some embodiments, the reading is performed using a contactless reader interface within the kiosk 404. The data read may include, for example, the key data stored in an RFID IC of the proximity payment device (e.g., such as the chip serial number, a key identifier and a key version). The message at "4" may also include information generated in the kiosk to establish a secure session between the kiosk (or between a security card 114 in the kiosk) and the proximity device issuer 406. The secure session, in some embodiments, may be established as follows.

(i) The security card 114 in the kiosk 404 (which may be, for example, a chip card formatted as an ID-1 chip card having a stored program adapted to establish a secure channel with the issuer) creates a first One-Time-Code, and sends it in the clear, to the proximity payment device issuer 406;

(ii) A security terminal at the proximity payment device issuer 406 has, for example, a server version of the same security program as the security card 114, and receives the first One-Time-Code from the security card 114, in the clear.

(iii) The security terminal at the proximity payment device issuer 406 then obtains the last used application transaction counter ("ATC") of the security card and checks the validity of an authenticated security token.

(iv) Next both security card 114 in the kiosk 404 and a security terminal at the proximity payment device issuer 406 each independently generate the next two security tokens.

(v) Next a unique session key is created based on these next two security tokens to protect, authenticate, and encrypt the communications channel between the security card 114 in the kiosk 404 and the security terminal at the proximity payment device issuer 406.

Pursuant to some embodiments, the session key is generated as follows:

(i) First, a security application at the issuer 406 is set to generate three 10 byte tokens with 2 bytes from the ATC and 8 bytes from the transaction counter ("TC");

(ii) the security card 114 in the kiosk 404 first generates a 10 byte token (referred to as "token #1") and sends the token to the issuer 406. The security card 114 also generates a 10 byte token "token #2" and a third 10 byte token "token #3".

(iii) the issuer 406 checks "token #1". If the token is valid, the issuer 406 independently generates "token #2" and "token #3". At this point, the kiosk 404 and the issuer 406 share token #2 and token #3, but have not communicated them to anyone. Pursuant to some embodiments, these shared (but not communicated) tokens are used to create a secret session key used for the communication channel between the security card 114 at the kiosk 404 and the issuer 406. The session is secure, as the tokens or keys are not transmitted nor shared.

(iv) The kiosk 404 and the issuer 406 now both separately calculate the session key. For example, the session key may be generated as follows:

Session key, low 8 bytes=3DES (token3 last 8 bytes) [token2 last 8 bytes]

Session key, high 8 bytes=3DES (token3 last 8 bytes) [token2 last 8 bytes XOR with 0x5555555555555555]

(v) the issuer 406 then responds with a message encrypted with 3DES(SessionKey) over [token2 last 8 bytes XOR with 0xAAAAAAAAAAAAAAAA]

(vi) The security card 114 of the kiosk 404 receives the message from the issuer 406 and decodes the message. If the kiosk 404 correctly arrives at the correct value for token #2, then the mutually authenticated encrypted secure link is established and SessionKey is used to secure communication between the security card 114 of the kiosk 404 and the remote issuer server 406.

Now a mutually authenticated secure communication channel exists between the proximity payment device issuer 406 and the kiosk 404 and all data sent to and from the issuer and kiosk is mutually authenticated and encrypted. The message data sent in message "4" is received by the remote issuer personalization system through the encrypted channel using the session key that was created as discussed above. At process "5", the issuer 406 decrypts the message, then uses the unwrapped key data (Key-ID#, Key-Ver#, Chip Serial#) and the master personalization key (KMC) to calculate the personalization key (KD) for the proximity payment device to be issued by the kiosk 404. The issuer 406 then creates the required personalization data for the proximity payment device to be issued from the kiosk 404. The personalization data is transmitted to the kiosk 404 (over the secure session) at message "6".

At process "7", the kiosk 404 receives the data and uses it to personalize a proximity payment device for dispensing to the consumer. Pursuant to some embodiments, the personalization data (payment account number, etc.) that was generated by the issuer 406 is stored in an RFID IC of the proximity payment device. The data may include track data (including the PAN and the other account data) for the proximity payment device. The kiosk may use the personalization key (KD) to create a message authentication code (MAC). In one currently preferred embodiment, proximity payment devices such as PayPass paper cards are pre-personalized as per the PayPass specifications and the specific account data created is small (just a few hundred bytes). The kiosk 404 may use the security card 114 to decrypt the personalization message received from the proximity payment device issuer 406. The personalization data is then used to personalize the proximity payment device (e.g., using a standard PayPass personalization function or the like). In some embodiments, the security card/perso module 114 uses the personalization data and writes the data to the proximity payment device.

In one currently preferred embodiment, the security card/perso module 114 includes a contactless card reader/writer that is contained within a Faraday cage in the kiosk 102 which prevents radio wave information leaking outside the kiosk 102. In some embodiments, the personalization data and its MAC code are sent to the proximity payment device which is being personalized, and, when the data is received by the proximity payment device, it is verified by the chip in the proximity payment device before the un-personalized chip accepts the account data. If the MAC verifies, the proximity payment device is then personalized. Processing concludes by dispensing the personalized proximity payment device.

In some embodiments, no additional data is printed on the proximity payment device. In some embodiments, a separate receipt is printed and dispensed from the kiosk 102 with the proximity payment device. For example, the receipt may be printed with account information associated with the proximity payment device.

As described herein, proximity payment devices may be remotely issued from kiosks or other dispensing devices. Features of one type of proximity payment device that may be issued using features of the present invention will be shown by reference to FIG. 6, where a schematic plan view of a proximity payment device 600 according to some embodiments is shown. In the embodiment shown, the proximity payment device 600 has a body 602, which may resemble conventional payment cards in shape and size. The body 602 may be formed from paper, cardboard, plastic or other suitable material. Embodiments of the present invention may be shaped or formed in any of a number of ways, and need not be formed in the shape of a card.

The proximity payment device 600, no matter the form or shape of the carrier, includes an RFID IC 604. The RFID IC 604 may be mounted and/or installed in any suitable manner in the body 602. For example, the RFID IC 604 may be embedded (partially or completely) or mounted on the body 302. The RFID IC 604 may be suitably designed and configured to transmit payment device account information (or other personal information) by radio frequency signaling to a POS terminal or other reader. In some embodiments, including the illustrative embodiment discussed herein, the RFID IC 604 may be designed and configured to operate in accordance with the "PayPass" standard promulgated by Master-Card International Incorporated, the assignee hereof.

The proximity payment device 600 may further include an antenna 606 embedded in or otherwise mounted on the body 602. As shown, the antenna 606 may be in the form of several loops arranged along the periphery of the body 602. Alternatively, the antenna 606 may be of a different type and/or configuration. The antenna may be operative generally in accordance with the above-mentioned PayPass standard to receive interrogation and power signals (which may be the same signal) from a proximity coupling device of a terminal device and to transmit payment device account number information and/or other information to the proximity coupling device. The antenna 606 may be coupled to the RFID IC 604 via terminals 608, 610, each coupled to a respective end of the antenna 606.

The RFID IC 604 stores data and programs therein. For example, a payment application as well as pre-personalization data may be stored in the RFID IC 604 upon completion of the pre-personalization process described in FIG. 4. A payment account number (or "PAN") and other payment data specific to an individual cardholder may be stored in the RFID IC 604 upon completion of the card issuance process (described in FIG. 2).

In some embodiments, lettering (not shown in FIG. 6) or other symbols (not shown in FIG. 6) may be present on the front surface 622 of the body 602 and/or on the rear surface (not shown) of the body 602. The proximity payment device 600 may have one or more magnetic stripes (not shown) on the body 602 to allow the proximity payment device 600 to be read by a magnetic card reader. Still further, the front surface 622 of the body 602 may carry one or more logos and/or brands, including for example the brand/logo of an international payment card association such as MasterCard International Incorporated. The brand/logo of the issuer may also be present, as well as, for example, a specific card product brand.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
 receiving, by a dispensing device, a purchase request to purchase a proximity payment device, the purchase request including a load amount;
 reading, by the dispensing device, proximity payment device information from a pre-personalized proximity payment device stored in the dispensing device;
 establishing, by a security card module associated with the dispensing device and a security terminal associated with a proximity device issuer server, a secure communications channel;
 encrypting, by the security module, a personalization data request to personalize the pre-personalized proximity payment device, the personalization data request comprising proximity payment device information, the load amount, and dispensing device identification information;
 transmitting, by the dispensing device via the secure communications channel to the proximity device issuer server, the encrypted personalization data request;
 receiving, by the dispensing device via the secure communications channel from the proximity device issuer server, an encrypted personalization message;

decrypting, by the security module, the encrypted personalization message to obtain personalization data;
writing, by the security module, the personalization data and the load amount to the pre-personalized proximity payment device to create a personalized proximity payment device; and
dispensing, by the dispensing device, the personalized proximity payment device.

2. The method of claim 1, further comprising, prior to establishing a secure communication channel, receiving, by the dispensing device, information identifying a payment source to use to fund the load amount, wherein the payment source comprises at least one of currency, a credit card account, and a debit card account.

3. The method of claim 2, wherein the payment source comprises at least one of the credit card account or the debit card account, and further comprising:
creating, by the dispensing device, a payment authorization request;
transmitting, by the dispensing device to a payment network, the payment authorization request; and
receiving, by the dispensing device, an authorization message from the payment network.

4. The method of claim 1, wherein the secure communications channel is established by:
creating, by the security card, a one-time-code;
transmitting the one-time-code to the security terminal of the proximity payment card issuer;
generating, by the security card and the security terminal, a first security token and a second security token;
creating a unique session key based on the first and second security tokens;
sharing, by the security card and the security terminal, the first and second tokens;
receiving, by the security card from the security terminal, a message; and
decoding the message with the unique session key to arrive at the correct value for the second token to establish secure communications between the security card and the security terminal of the proximity payment device issuer.

5. The method of claim 1, wherein the personalization request further comprises an integrated circuit (IC) serial number of the pre-personalized proximity payment device, and at least one of a key identifier, and a key version.

6. The method of claim 1, wherein the personalization data comprises a primary account number (PAN) of a consumer.

7. A remote dispensing device, comprising:
a data entry device;
a feeder storing at least one pre-personalized proximity payment device;
a network interface for communicating with a proximity payment device issuer of the pre-personalized proximity payment device;
a processor;
a security card operably connected to the processor; and
a storage device operably connected to the processor and storing instructions configured to cause the processor to:
receive, from the data entry device, a purchase request to purchase a proximity payment device, the purchase request including a load amount;
read proximity payment device information from a pre-personalized proximity payment device stored in the dispensing device;
establish, by utilizing the security card, a secure communications channel with a security terminal associated with a proximity device issuer server;
encrypt, by utilizing the security card, a personalization data request to personalize the pre-personalized proximity payment device, the personalization data request comprising proximity payment device information, the load amount, and dispensing device identification information;
transmit, via the secure communications channel to the proximity device issuer server, the encrypted personalization data request;
receive, via the secure communications channel from the proximity device issuer server, an encrypted personalization message;
decrypt, by utilizing the security card, the encrypted personalization message to obtain personalization data;
write, by utilizing the security card, the personalization data and the load amount to the pre-personalized proximity payment device to create a personalized proximity payment device; and
dispense the personalized proximity payment device.

8. The apparatus of claim 7, wherein the storage device stores instructions, prior to the instructions for establishing a secure communication channel, configured to cause the processor to receive information identifying a payment source to use to fund the load amount, wherein the payment source comprises at least one of currency, a credit card account, and a debit card account.

9. The apparatus of claim 8, wherein the network interface is further configured to communicate with a payment network, the storage device further storing instructions adapted to be executed by said processor to:
create a payment authorization request;
transmit the payment authorization request to the payment network; and
receive an authorization message from the payment network.

10. The apparatus of claim 7, wherein the instructions for establishing the secure communications channel comprises instructions configured to cause the processor to:
create, by utilizing the security card, a one-time-code;
transmit the one-time-code to the security terminal of the proximity payment card issuer;
generate, by utilizing the security card, a first security token and a second security token;
create a unique session key based on the first and second security tokens;
share, by utilizing the security card, the first and second tokens;
receiving, by the security card from the security terminal, a message with the security terminal; and
decode the message with the unique session key to arrive at the correct value for the second token to establish secure communications between the security card and the security terminal of the proximity payment device issuer.

11. The apparatus of claim 7, wherein the instructions for requesting personalization further comprises instructions configured to cause the processor to transmit an integrated circuit (IC) serial number of the pre-personalized proximity payment device, and at least one of a key identifier, and a key version.

12. The apparatus of claim 7, wherein the instructions for writing the personalization data further comprises instructions configured to cause the processor to write a primary account number (PAN) of a consumer to the pre-personalized proximity payment device.

* * * * *